C. FREDRICKS.
FISHING TACKLE.
APPLICATION FILED NOV. 1, 1920.
1,394,616. Patented Oct. 25, 1921.
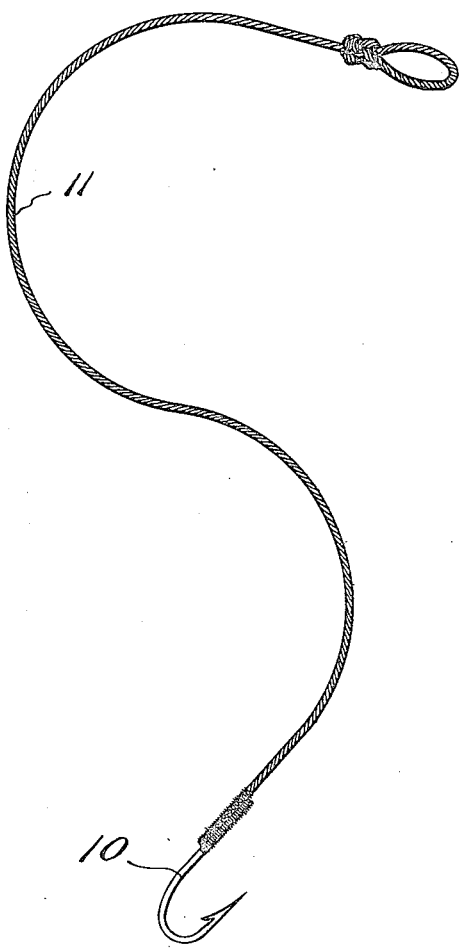
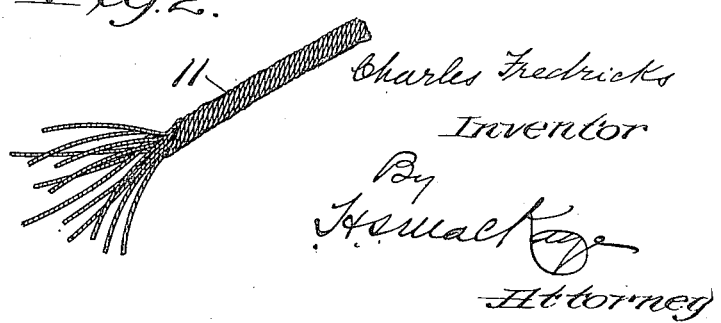
Charles Fredricks
Inventor

UNITED STATES PATENT OFFICE.

CHARLES FREDRICKS, OF BROOKLYN, NEW YORK.

FISHING-TACKLE.

1,394,616.  Specification of Letters Patent.  Patented Oct. 25, 1921.

Application filed November 1, 1920. Serial No. 421,051.

*To all whom it may concern:*

Be it known that I, CHARLES FREDRICKS, a citizen of the United States, residing in Brooklyn borough, county of Kings, city and State of New York, have invented a certain Improvement in Fishing-Tackle, of which the following is a specification.

It has long been known that the worms found on sea beaches and variously known as "sea worms" or "sand worms" and "blood worms" are particularly attractive bait for many fish, and particularly for flounders and other fish that are caught near the bottom.

In seeking to make this fact useful in the improvement of fishing tackle, I have found by study that when these worms are exposed under water they have a glistening or glinting red appearance giving the impression of giving out a reddish light of their own. Angle worms possess the same peculiarity in a less degree.

In order to take advantage of this discovery, I have experimented with a view to producing a combination of hook and leader or lure which should present to a fish under water the translucent and glistening or glinting red appearance presented by a "sand worm" when exposed in water; either separately or with a bait or fish on the hook. When a fish is used for bait it has the appearance of a fish biting at a sand worm, which heightens the deception. Or if a clam or similar bait be used, the appearance is produced of a worm biting upon the clam. Thus a combination artificial and natural bait is produced.

My invention carries out this idea in the manner hereinafter described in connection with the accompanying drawings wherein Figure 1 is a view of a fish hook and leader or lure and Fig. 2 is a view of a part of the leader on an enlarged scale and shaded for red color in accordance with the usual convention.

The hook, which may be of any well known character, is shown at 10, attached as usual, to the end of a leader or lure 11. This leader or lure, instead of being made white as has generally been the idea hitherto, (which repels fish inclined to be nervous) is made moderately large, and is so prepared as to have a glistening or glinting or self luminous effect with a bright red tint thereby acting as a lure. As shown in Fig. 2 a twisted cord-like effect is favorable.

While I may employ any appropriate material and coloring matter to obtain the effect in question, I prefer to use leaders made of silk worm gut dyed a vivid red, whereby the peculiar translucent glinting, red, self luminous effect above described is obtained. This effect is referred to in one of my claims as a "light transforming" effect.

I have found by actual experience after a series of competitive trials, that, where hooks are attached to leaders or lures of the character described, they are much more successful in catching fish than those attached to the ordinary snell or leader.

What I claim is—

1. A fish hook in combination with a leader or lure having a glinting red appearance, substantially as described.

2. A fish hook in combination with a leader or lure composed of twisted strands made of silk worm gut dyed red.

3. In a fishing tackle, a flexible, translucent, light transforming lure substantially as described.

In testimony whereof I have hereto set my hand on this 29th day of October, 1920.

CHARLES FREDRICKS.